United States Patent [19]

Schmidt et al.

[11] Patent Number: 5,374,039
[45] Date of Patent: Dec. 20, 1994

[54] FLUID-AND-ELASTOMER SUPPORT DEVICE

[75] Inventors: Warren E. Schmidt; Dennis P. McGuire, both of Erie, Pa.

[73] Assignee: Lord Corporation, Erie, Pa.

[21] Appl. No.: 934,402

[22] Filed: Aug. 24, 1992

[51] Int. Cl.⁵ .................................................. F16F 5/00
[52] U.S. Cl. ............................ 267/140.13; 137/513.3; 267/140.12
[58] Field of Search ............ 267/140.12, 140.13, 267/140.11, 219, 319, 322.13, 322.14, 322.15; 180/300, 312, 902; 248/562, 636; 137/513.3

[56] References Cited

U.S. PATENT DOCUMENTS

| | | | |
|---|---|---|---|
| 2,780,321 | 2/1957 | Sturari | 188/319 |
| 3,638,885 | 2/1972 | Reed | 244/17.27 |
| 4,105,365 | 8/1978 | Ferris et al. | 416/107 |
| 4,236,607 | 12/1980 | Halwes et al. | 188/1 B |
| 4,257,739 | 3/1981 | Covington et al. | 416/134 A |
| 4,428,569 | 1/1984 | Takei | 267/140.1 |
| 4,566,677 | 1/1986 | LePierres | 267/140.1 |
| 4,613,118 | 9/1986 | Morita | 267/140.1 |
| 4,673,156 | 6/1987 | Tabata | 248/562 X |
| 4,721,291 | 1/1988 | Makibayashi et al. | 267/140.13 |
| 4,733,854 | 3/1988 | Miyamoto | 267/140.1 |
| 4,768,760 | 9/1988 | Fol | 248/562 X |
| 4,778,343 | 10/1988 | Hahn et al. | 416/134 A |
| 4,811,919 | 3/1989 | Jones | 244/53 R |
| 4,893,988 | 1/1990 | Sato | 416/140 |
| 4,958,811 | 9/1990 | Brenner et al. | 267/219 X |
| 5,004,215 | 4/1991 | Aubry et al. | 267/140.13 |
| 5,092,738 | 3/1992 | Bymes et al. | 416/134 A |
| 5,172,893 | 12/1992 | Bouhier et al. | 267/140.12 |

FOREIGN PATENT DOCUMENTS

| | | | |
|---|---|---|---|
| 372169 | 6/1990 | European Pat. Off. | 267/140.12 |
| 538802 | 11/1931 | Germany | 137/513.3 |
| 758908 | 10/1956 | United Kingdom | 137/513.3 |

Primary Examiner—Matthew C. Graham
Attorney, Agent, or Firm—Randall S. Wayland; Richard K. Thomson; James W. Wright

[57] ABSTRACT

A damping device which provides superior damping stiffness K", has linear damping characteristics as a function of amplitude and for which the temperature sensitivities of stiffnesses K*, K", K' have been minimized. The device includes a first second fluid-filled chambers which are interconnected by a passageway. The length and diameter of the passageway, as well as the fluid viscosity, are chosen to give the optimum damping characteristics. Further, a plurality of spring loaded pressure relief valves are integrated into the assembly to allow more flow area to open when a threshold pressure is encountered, thereby reducing the internal pressures and dynamic stiffness K* at cold temperatures.

7 Claims, 5 Drawing Sheets

FLUID-AND-ELASTOMER SUPPORT DEVICE

FIELD OF THE INVENTION

This invention relates to the area of fluid-and-elastomer devices. Specifically, the invention relates to the area of fluid-and-elastomer devices for providing damping for lead-lag motions of a helicopter rotor blade.

BACKGROUND OF THE INVENTION

Flexible dampers for attachment between a rotor hub assembly and a rotor blade or cuff which exhibit a high degree of damping are desirable for damping lead-lag motions of rotor blades on helicopters. Typically, elastomers are used to provide this damping, such as taught in U.S. Pat. No. 5,092,738 to Byrnes et al., U.S. Pat. No. 4,778,343 to Hahn et al., and U.S. Pat. No. 4,893,988 to Sato. The high degree of damping exhibited by these dampers is typically produced by bonding the dampers in a highly-damped elastomer such as silicone. However, these elastomeric dampers are inherently nonlinear as a function of amplitude and can produce a loss factor of only about 0.7. This is insufficient, under certain conditions, to control excessive motions of the helicopter rotor blade.

Additional damping can be added, over and above what is available in an elastomeric damper, by incorporating a fluid within the damper to provide damping at certain predetermined, or tuned, frequencies. The commonly assigned U.S. Pat. No. 4,811,919 to Jones, which is hereby incorporated by reference, describes the addition of fluid to an elastomeric mounting which is suitable for mounting an aircraft engine to a strut, and also describes the means for compensating for the fluid expansion due to temperature changes. U.S. Pat. No. 4,236,607 to Halwes et al. describes a vibration suppression system wherein the fluid passes through the inner member of the mounting to provide amplified counter inertial forces.

U.S. Pat. No. 4,566,677 to Le Pierres which is herein incorporated by reference describes a damped fluid-and-elastomeric, lead-lag damper for helicopter rotor blades, whereby the fluid is used to add additional damping over and above what is available from the elastomer alone. However, this damper is axially-acting and cannot carrying vertical loads due to flapping, which must be accommodated in bearingless rotor systems. Furthermore, U.S. Pat. No. 5,004,215 to Aubry et al., which is also herein incorporated by reference, describes another axially acting strut-type damper with linear damping by incorporating a viscous fluid. Again, this device cannot carry vertical loads due to flapping motions of the rotor blade, a normally required feature of dampers which are to be used in bearingless rotor systems.

In rotor-damping systems, and in fluid devices in general, the requirements for high damping, which necessitates the use of damped elastomers and viscous fluids, tend to make the dampers undesirably stiff when exposed to low temperatures. The Aubry et al. '215 device describes a resilient return strut for use with helicopter rotors which uses reed-type valves for limiting the pressure which can build up within the fluid chambers. However, these types of pressure-limiting valves do not allow for free flow of fluid during normal operating conditions. U.S. Pat. No. 4,613,118 to Morita describes a fluid mounting suitable for connecting to an engine which incorporates a valve mechanism 450 to limit the pressure within the fluid chamber. Upon encountering a situation which requires pressure relief, a threshold pressure is exceeded, and more flow area is opened in fluid-parallel relation with the fluid orifice. This mechanism is complicated, non-linear, in that it has different properties in each direction, and requires a separate orifice and valve in parallel in order to get unimpeded or unblocked flow for normal operating conditions. Alternate embodiments in Morita allow for the valve and fluid-flow path to be in a fluid-series relationship. However, this arrangement does not allow for unblocked flow during normal operating conditions.

SUMMARY OF THE INVENTION

In light of the advantages and shortcomings of the similar dampers, it is therefore a primary object to provide a fluid-and-elastomer, lead-lag damper for helicopter rotors which can carry vertical flap loads.

Another objective is to provide a fluid-and-elastomer, lead-lag damper for use on a helicopter rotor system which provides linear rotor blade damping as a function of amplitude and also is capable of carrying vertical flap loads.

Another object is to provide a fluid-and-elastomer, lead-lag damper which provides rotor blade damping and which is particularly suitable for use on bearingless rotor systems.

Yet another object is to provide a fluid-and-elastomer device which has equal damping characteristics in both directions while in the normal operating condition, and whilst undergoing pressure relief situations.

It is yet another object is to provide a fluid-and-elastomer device which has equal damping characteristics in both directions and which includes pressure relief within an integrated package.

It is another object is to provide a fluid-and-elastomer device which has linear damping characteristics in both directions while in the normal operating condition and which includes pressure relief within an integrated package.

In summary, it is a feature of the instant invention to provide the above mentioned objects by providing a fluid-and-elastomer device for attaching between a rotor cuff and a rotor hub on a helicopter rotor system, comprising a first variable-volume chamber, a second variable-volume chamber, a primary passageway connecting the first and second variable-volume chambers, a housing recessed into the rotor cuff, the housing defining a portion of the first and second variable-volume chambers, an elastomer section also defining a portion of the first and second variable-volume chambers, the elastomer section reacting vertical loads due to flapping of the rotor cuff relative to the rotor hub. A fluid is contained within said first and second variable-volume chambers and primary passageway and a piston is attached to the rotor hub by means of an intermediate member such that when said piston is displaced relative to said housing the fluid is displaced through the primary passageway and between the first and second variable-volume chambers.

It is also a feature of the instant invention to provide the above mentioned objects by providing a fluid-and-elastomer device, comprising a first variable-volume chamber, a second variable-volume chamber, a housing which defines a portion of the first and second variable-volume chambers, an elastomer section also defining a portion of the first and second variable-volume chambers, a piston that when displaced relative to the housing displaces a fluid between the first and second variable-volume chambers, a damping fluid contained within and substantially filling the first and second variable-volume chambers and a passageway assembly allows the fluid to flow between said first and second variable-volume chambers.

The passageway assembly further includes a primary passageway integrated into the passageway assembly which is unblocked for normal operating conditions, an auxiliary flow path integrated into the passageway assembly such that the flow through the auxiliary flow path is only allowed in one direction from one of the first or second variable-volume chamber to the other of the first or second variable-volume chamber when the pressure differential is above a threshold pressure occurring between the first and second variable-volume chambers.

It is an advantage of the present invention that the passageway assembly can provide linear damping and pressure relief, all within one integrated package.

It is among the advantages of the present invention that the fluid-and-elastomer damper can be utilized to provide a damping loss factor of about 1.3 and can be used in bearingless rotor systems.

The above mentioned and further objects, features and advantages of the present invention will become apparent from the accompanying descriptions of the preferred embodiment and attached drawings.

BRIEF DESCRIPTION OF THE DRAWINGS

The accompanying drawings which form a part of the specification, illustrate an embodiment of the present invention. The drawings and description together, serve to fully explain the invention. In the drawings.

DETAILED DESCRIPTION OF THE INVENTION

Figure 1:
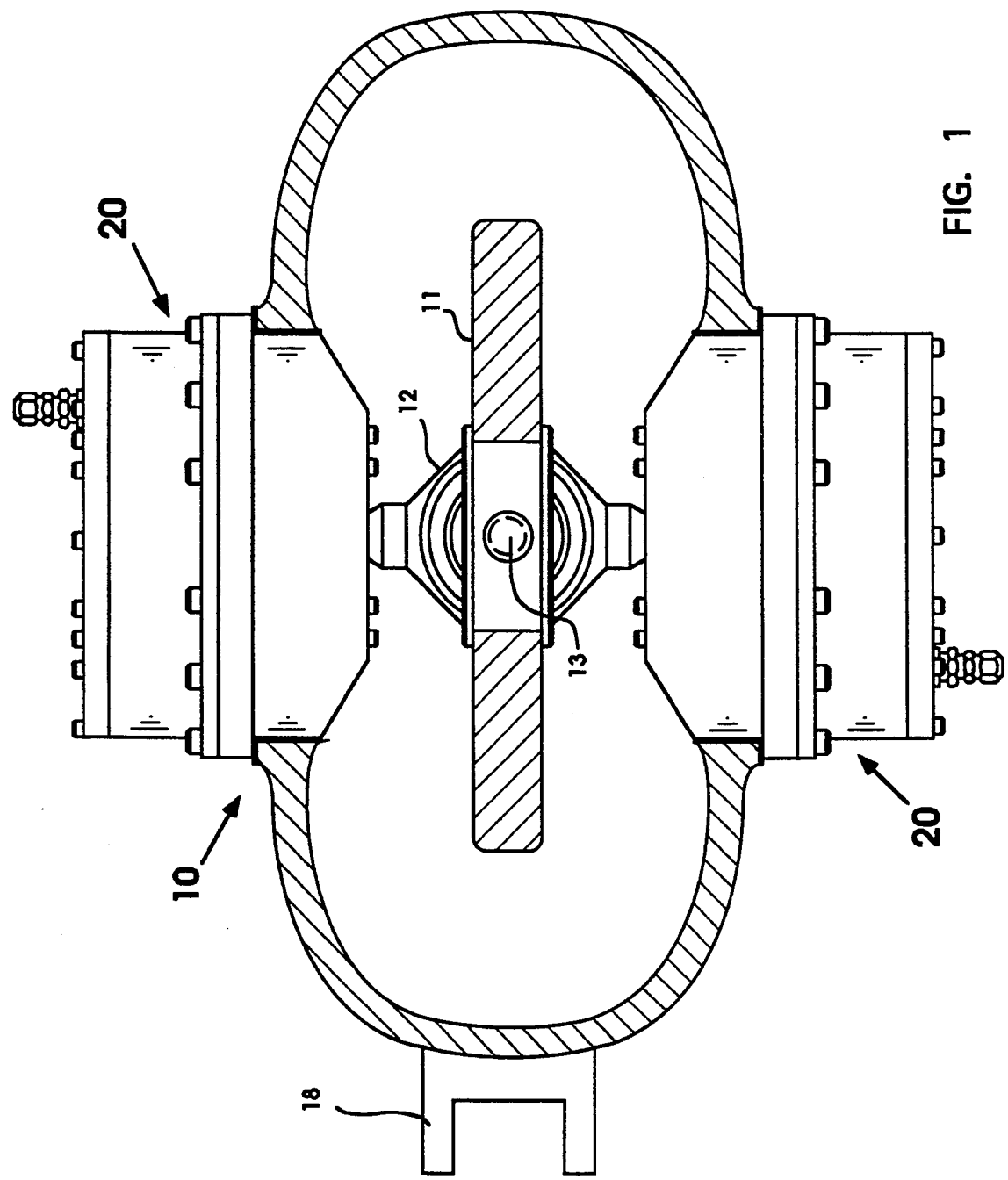
FIG. 1 is a side view in partial section showing the installed environment of an embodiment of the fluid-and-elastomer device.

In FIG. 1, an embodiment of a fluid device 20 is shown installed in the environment of the bearingless rotor system 10. The bearingless rotor system generally includes a rotor hub 11 which is preferably of composite construction and which attaches to a mast (not shown) of a helicopter, and a centering bearing 12 or other intermediate member which is generally an elastomeric bearing and which is attached to rotor hub 11 via a shaft 13, or other means. It also includes a rotor cuff 14 which surrounds the portion of the rotor hub 11 shown and which is preferably of aluminum, but may be of composite construction. A pitch horn 18 is generally attached to the rotor cuff 14 such that pitch control can be imparted to the cuff 14 and rotor blades (not shown). The system shown also includes the fluid device 20 of the present invention, as contrasted with prior systems generically known as bearingless rotor systems 10, which utilized purely elastomeric dampers. The fluid device 20 describe herein was initially conceived for use in the bearingless rotor environment; however, more conventional installations can be envisioned, as well.

Figures 2, 3:
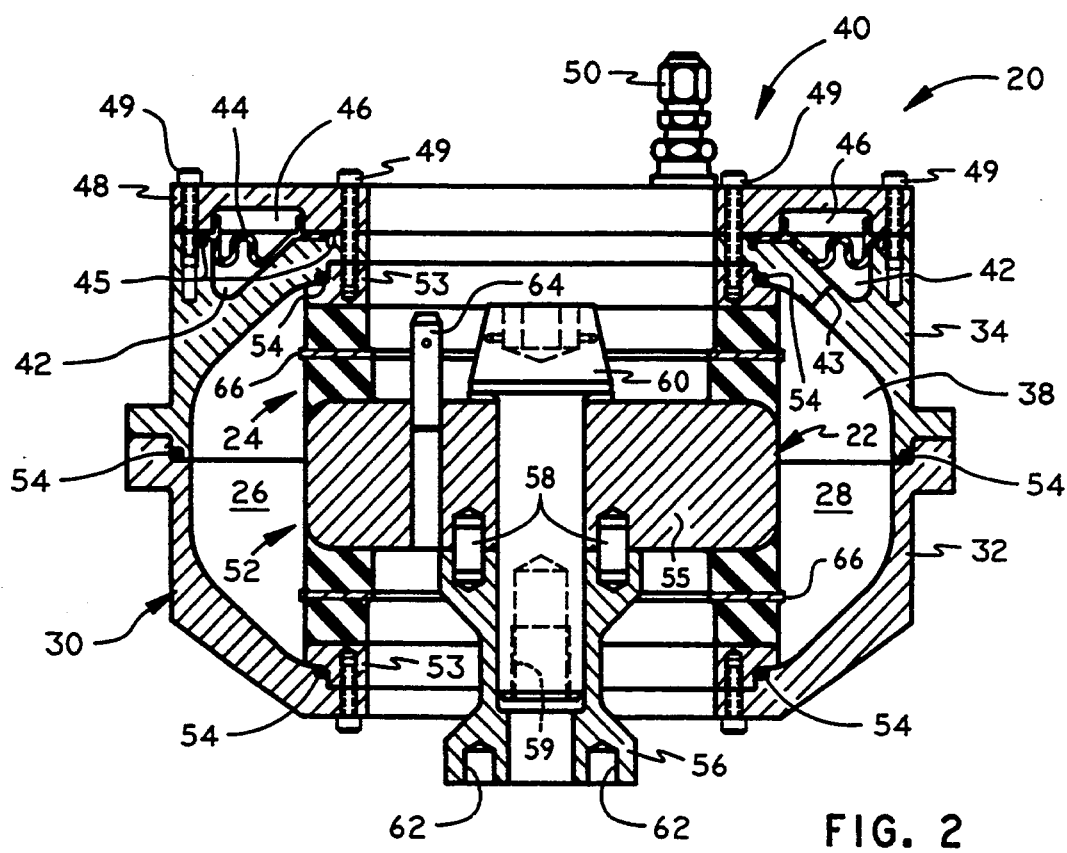
FIG. 2 is a sectioned front view illustrating an embodiment of the device.
FIG. 3 is a sectioned side view of the device.

As shown in FIG. 2, the fluid device 20 includes a piston 22 which pumps the fluid within the fluid device 20 and which attaches to the previously mentioned centering bearing 12, or other intermediate member which acts as the means for connecting or interconnecting to the rotor hub 11. The fluid device 20 includes an elastomer section 24, of preferably laminated shim-and-elastomer construction, which defines a portion of a first variable-volume chamber 26 and which also defines a portion of a like, and generally opposed, second variable-volume chamber 28. The fluid device 20 is designed so that each variable volume chamber 26,28 has a relatively high volume stiffness, i.e., in excess of about 100 psi per cubic inch ($psi/in^3$). The elastomer section 24 also provides the stiffness for reacting vertical loads which are due to relative flapping motions which occur between the rotor cuff 14 and rotor hub 11.

A housing 30 also defines a portion of the first and second variable-volume chambers 26 and 28, and encloses virtually the entire inner workings within the fluid device 20. The housing 30 is preferably made of aluminum and is anodized for corrosion protection and includes a first half 32 and a second half 34 which are bolted together, recessed in, and fastened to, the rotor cuff 14. The piston 22 may include two primary passageways formed therethrough for connecting, and allowing damping fluid 38 to flow between, the first variable-volume chamber 26 and second variable-volume chamber 28. The fluid 38 is contained within, and substantially fills, the first variable-volume chamber 26, second variable-volume chamber 28, and interconnecting passageways.

The fluid device 20 also includes pressurizer 40 of the compressed-air type for statically pressurizing the fluid 38 such that cavitation of the fluid 38 under large amplitudes does not occur. Other means for pressurizing and compensating for fluid expansion could be used as well. The pressurizer 40 also compensates for expansion and contraction of the fluid 38 due to temperature changes. The pressurizer 40 includes a third chamber 42 which is annular shaped and is interconnected to one of said first and second chambers 26 and 28 by way of a small passageway 43, a separator 44 such as a flexible diaphragm which includes seal 45, a fourth chamber 46 which is annular in shape and which is filled, under pressure, with air or the like, a plate 48 for attaching to second half 34 by way of bolts 49, and a valve 50 for providing the access for pressurization.

The piston 22, elastomer section 24 and outer member 53 together make up the insert assembly 52 which is inserted between halves 32 and 34 of housing 30. As halves 32 and 34 are urged together by bolts not shown, the O-rings 54 are compressed to form a permanent seal to prevent escape of the fluid 38. Displacement of the piston 22 relative to the housing 30 will cause fluid 38 to be displaced between the first and second variable-volume chambers 26 and 28. The piston 22 includes an inner member 55, a spacer 56 which is located relative to the inner member 55 by way of pins 58, and a fastener 60. Threads 59 formed within fastener 60 attach to a stud (not shown) which is, in turn, attached to centering bearing 12 (FIG. 1). Tightening fastener 60 urges centering bearing 12 (FIG. 1) in contact with spacer 56. The bores 62 accept pins which are press fit into the centering bearing 12 (FIG. 1) in the same manner as the pins 58 are installed in the spacer 56. A pin 64 is cross drilled and pressed into the inner member 55 such that safety wire (not shown) can be placed through the cross-drilled hole in the fastener 60 and also through cross-drilled hole in pin 64, and thus, restrain fastener 60 from turning and unscrewing.

Another view of the fluid device 20 is illustrated in FIG. 3. The shims 66 are flat and extend in a plane perpendicular to the line of vertical load application A. Two primary passageways 68 extend between first variable-volume and second variable-volume chambers 26 and 28 (FIG. 2). The elastomer section 24 wraps completely around the inner member 55 and is preferably a natural rubber elastomer with a loss factor (tan delta) of less than 0.4, and more preferably a loss factor (tan delta) of about 0.1. The elastomer section 24 is preferably integrally bonded to outer member 53 and to inner member 55. Further, close tolerances between the outer member 53 and the inner surfaces 70 of the upper and lower halves 32 and 34 will allow fluid 38 (FIG. 2) to flow only through the primary passageways 68.

Figure 4:
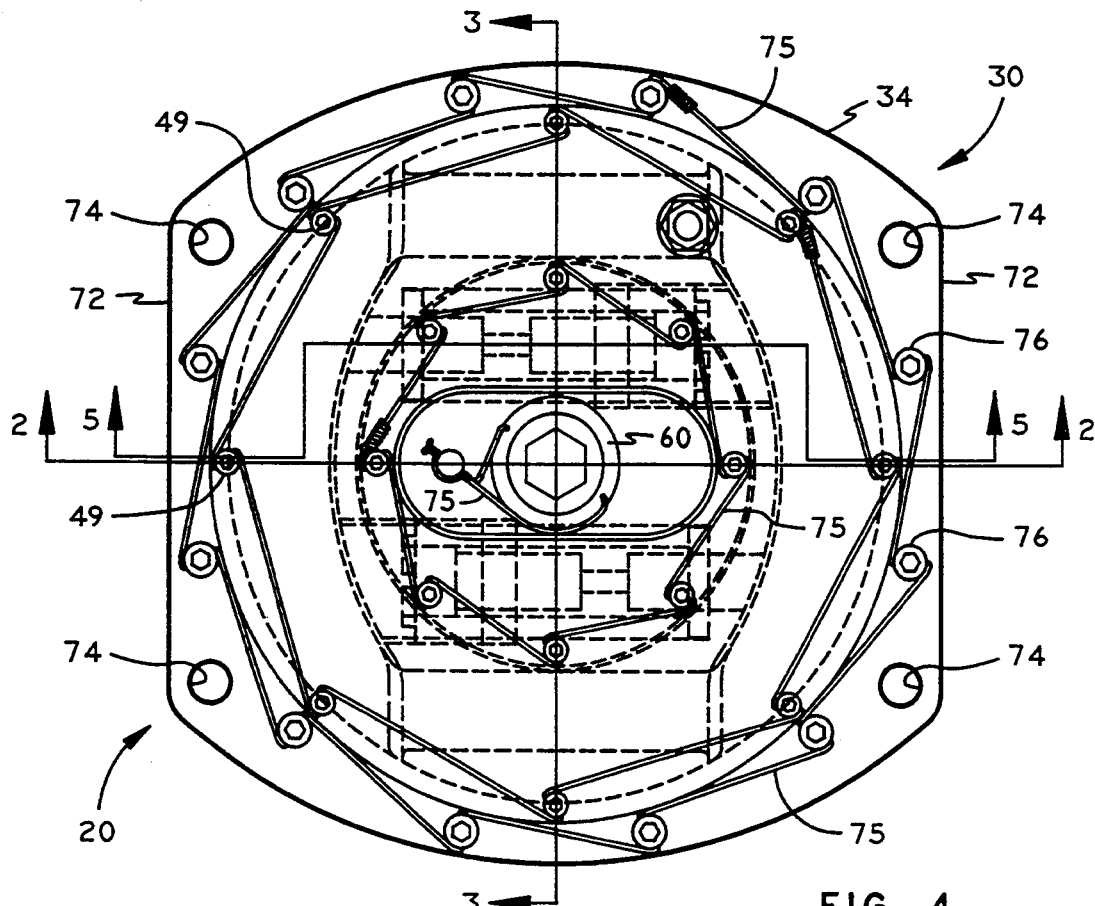
FIG. 4 is an top view of the device.

Another view is illustrated in FIG. 4. Fluid device 20 is shown with bores 74 through flanges 72 in first and second halves 32 (FIG. 3) and 34 of housing 30. Fastener 60 includes an internal hex as shown. Further, all bolts 49 and bolts 76 are wired together by safety wire 75.

Figure 5:
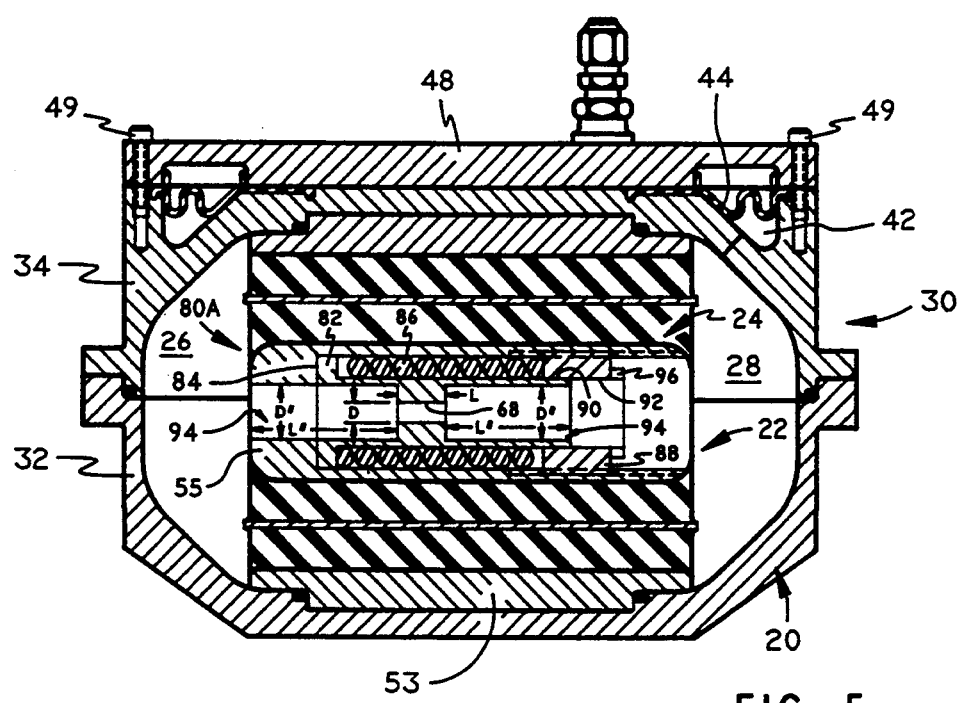
FIG. 5 is another frontal sectional view of the device.
Figure 6:
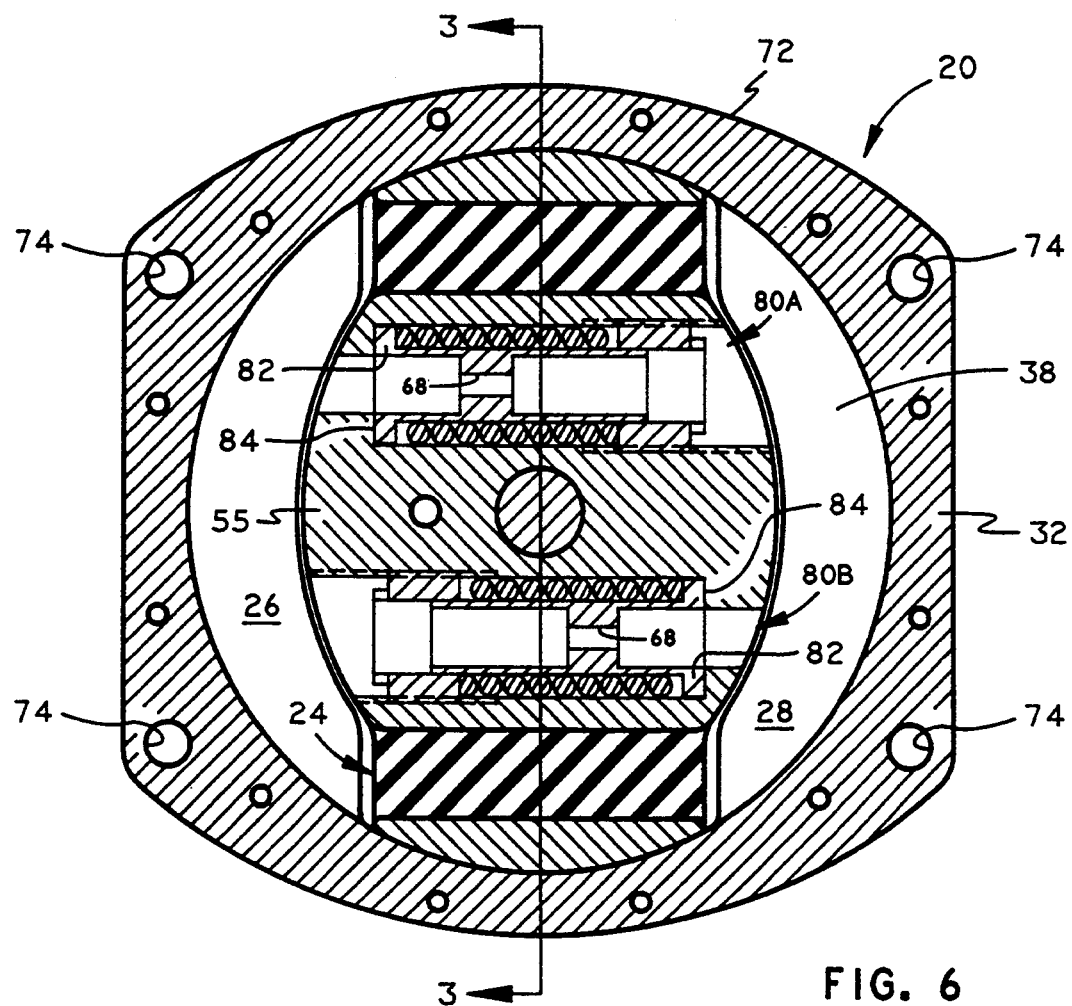
FIG. 6 is a sectioned top view of the device.

Another view of the fluid device 20 is illustrated in FIG. 5 wherein one of the passageway assemblies 80A is shown installed in the inner member 55. A like passageway 80B is shown in FIG. 6. The assemblies 80A and likewise 80B (FIG. 6), include a floating member 82 which has a seat 84 which seals against a similar seat formed in inner member 55. The assemblies 80A and 80B (FIG. 6) also includes a spring 86 which biases the seat 84 against inner member 55 and an adjuster 88 which adjusts the compression of spring 86. The floating member 82 includes a central portion 90 over which the spring 86 is located and slides. The central portion 90 also slides freely within bore 92 formed in adjuster 88. The adjuster 88 includes screwdriver slots 96 and/or a wrench profile for providing for adjustment.

Integral with the assembly 80A and also 80B (FIG. 6) are the primary passageways 68 having a diameter D and a length L which are chosen to provide linearity, such that for selected ranges, the stiffnesses $K^*$, $K'$ and $K''$ remain constant. $K^*$ is the complex stiffness, $K'$ is the real, or in-phase stiffness, while $K''$ is the imaginary, or out-of-phase, stiffness. By way of example and not by limitation, the present invention fluid device 20 provides complex stiffness $K^*$ which is linear for amplitudes of 0.01 to 0.35 inch with values of stiffness $K^*$ between approximately 7200 lb/in and 5600 lb/in at approximately 5 Hz. The linear range is defined as the range wherein not more than 15% deviation from nominal $K^*$ is present. Linear damping is achieved by the appropriate choice of diameter D, and length L and viscosity $\mu$. By way of example, the diameter D of the present invention should be in the range of 0.05 and 0.5 inch, and the length L should be in the range of 0.25 and 2.5 inch. Furthermore, the kinematic viscosity should be in the range of between 1,000 and 10,000 centistokes (cs) and more preferably 2000 cs. One very distinct advantage is that the present invention allows for linear damping level regardless of the direction of fluid flow. The transition zone 94 which occurs at the entrance and exit to the passageway 80 each have a diameter $D'$ and a length $L'$ such that the conditions imposed for each direction result in uniform losses. This is particularly important in systems which require linearity as a function of amplitude in each direction.

Another view is illustrated in FIG. 6 which shows the fluid device 20 and two passageway assemblies 80A and 80B. The passageway assemblies 80A and 80B allow fluid 38 to flow between the chambers 26 and 28. The two primary passageways 68 within the assemblies 80A and 80B are in fluid-parallel relationship and are unblocked for normal conditions. For normal operating conditions, the damping level is also linear as a function of amplitude, due to the appropriate choice of the diameter D, length L and kinematic viscosity $\mu$ of the damping fluid. These parameters can be adjusted to allow for linearity of $K^*$, $K'$, and $K''$. In addition, the flow of fluid 38 through each primary passageway 68 is approximately equal. However, when a threshold pressure differential is reached between the fluid chambers 26 and 28, the floating member 82 within the assembly 80A or 80B will open, depending on direction, and allow more fluid-flow area to be accessible through auxiliary flow path 98 (FIG. 3), which in this case are shown as channels. This will limit the maximum pressure that can occur when high-amplitude conditions are imposed on the fluid device 20, and also when very cold temperature conditions are encountered, which causes an increase in fluid viscosity. In addition, the passageway 68 and the pressure-relief valve are integrated into one package within the passageway assemblies 80A and 80B.

The floating members 82 of the passageway assemblies 80A and 80B act in different directions. The floating member 82 of each assembly 80A and 80B are oriented to act in one direction only. In other words, the auxiliary flow path can only flow in one direction for providing pressure relief. In this manner passageway assembly 80A only opens when the threshold fluid pressure differential is exceeded and the highest pressure occurs in chamber 26. Likewise, passageway assembly 80B only opens when the threshold fluid-pressure differential is exceeded and the highest pressure occurs in chamber 28. In this way, even when under going a pressure-relief situation, equal amounts of damping can be present in each direction. In summary, these pressure-relief valves within the assemblies 80A and 80B act in such a manner that when normal conditions occur, the seats 84 of floating members 82 are in contact with the inner member 55 and the auxiliary flow path 98 has no fluid flowing in it. Upon reaching the threshold pressure, the floating member 82 is opened, and fluid 38 flow is channeled through the auxiliary flow path 98, such as the plurality of channels shown.

Figure 7:
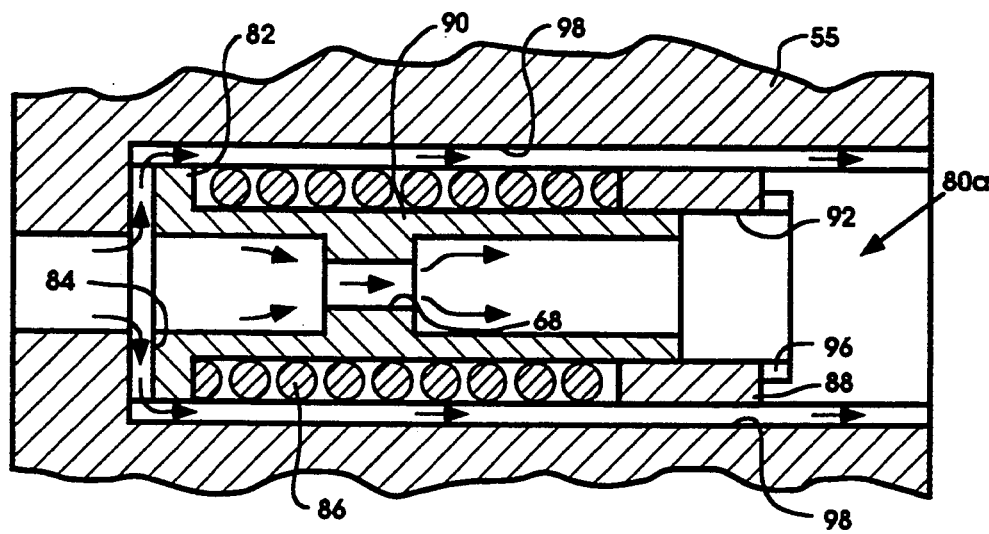
FIG. 7 is a breakout view of the device showing the floating member in a pressure relieving position.

A breakout view of the passageway assembly 80A is illustrated in FIG. 7. The assembly 80A includes a floating member 82 which includes a valve face 84 which seals against a seat formed in inner member 55. The assembly 80A also includes a spring 86 which biases or spring loads the valve face 84 against the seat in the inner member 55. The coil spring shown has a spring rate of about 75 lb/in. The assemblies also include an adjuster 88 which adjusts the compression of spring 86. The adjuster 88 includes screwdriver slots 96 and/or a wrench profile and is threaded to providing the means for adjustment of the amount of pressure exerted on the seat 84 point of break, or the point at which pressure relief starts. This pressure relief/passageway device is integrated into one compact package which can be used to limit the pressure in one direction. In order to limit the pressure in two directions, two opposed assemblies 80A and 80B are used.

Figure 8:
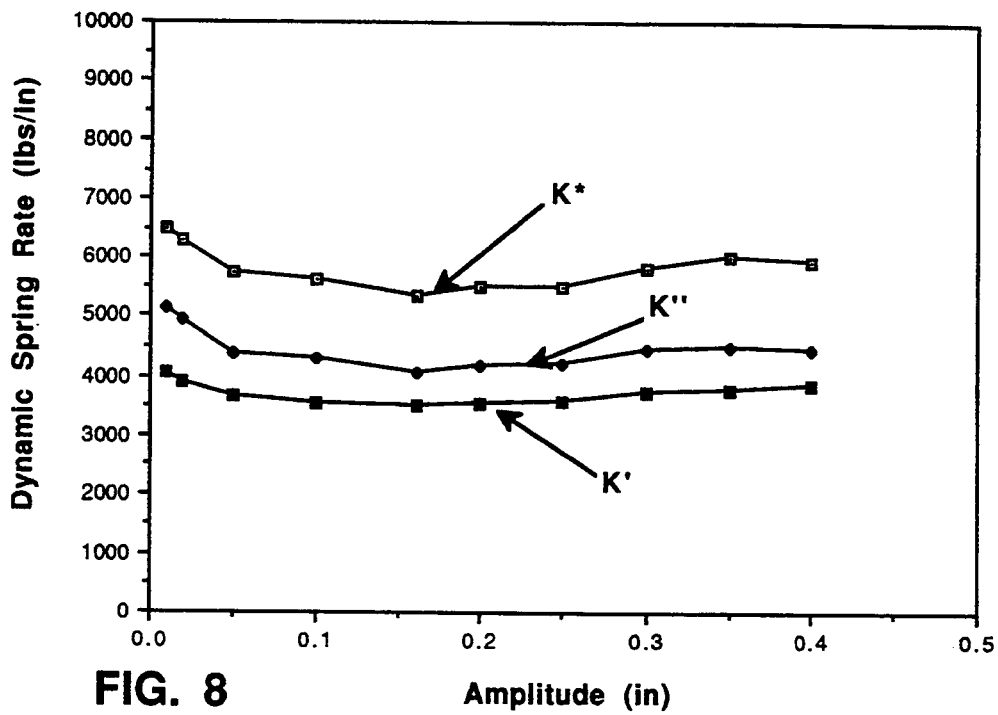
FIG. 8 is a performance plot of $K^*$, $K'$, and $K''$ as a function of amplitude of the device.

FIG. 8 illustrates a performance curve for the fluid device 20. This particular damper was tuned to provide linearity in K" over a broad range of amplitudes and at about 5 Hz. The parameters can be adjusted such that linearity occurs at other frequencies over a broad frequency range.

Figure 9:
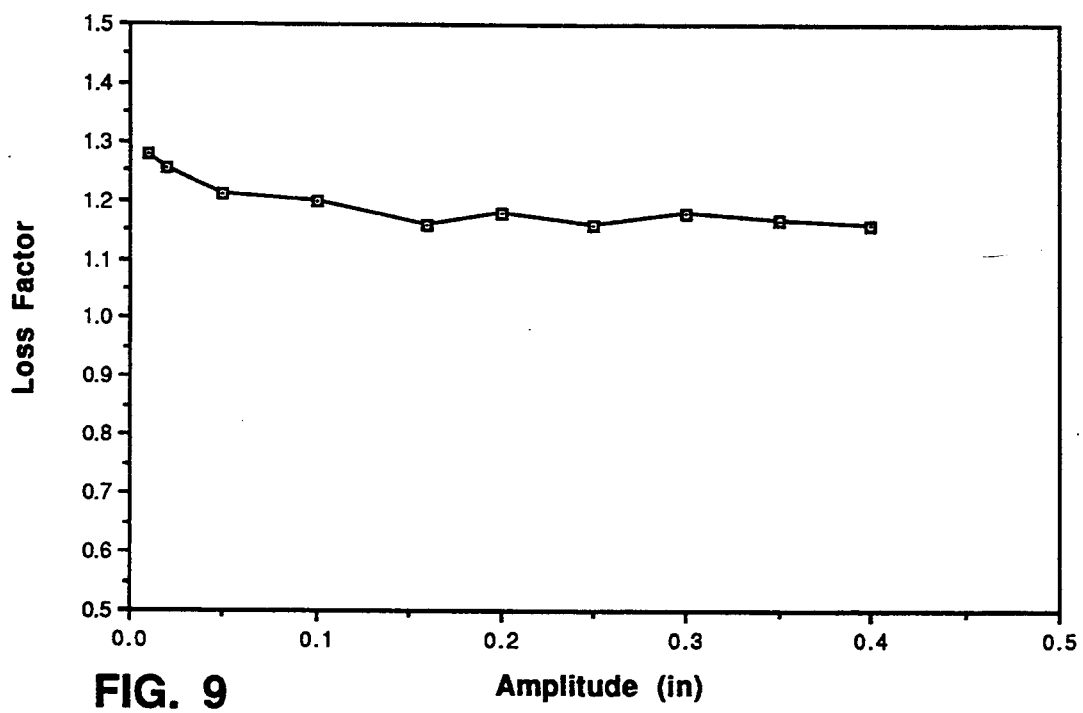
FIG. 9 is a performance plot of loss factor as a function of amplitude of the device.

FIG. 9 illustrates a performance curve for the fluid device 20. The loss factor (tan delta) is shown as being relatively insensitive to amplitude or linear as a function of amplitude. The loss factor for this embodiment can range from about 1.3 to 1.1depending on amplitude. However, note that the K' component is relative low and in fact, the real component K' is less than the damping component K".

While one embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A fluid-and-elastomer device, comprising:
   (a) a first variable-volume chamber;
   (b) a second variable-volume chamber;
   (c) a housing formed which defines a portion of said first and said second variable-volume chambers;
   (d) an elastomer section also defining a portion of said first and said second variable-volume chambers, said elastomer section providing a high volume stiffness to each of said first and second variable-volume chambers;
   (e) a piston that when displaced relative to said housing displaces a fluid between said first and said second variable-volume chambers;
   (f) said fluid contained within, and substantially filling, said first variable-volume chamber and said second variable-volume chamber; and
   (g) a removable passageway assembly allowing said fluid to flow between said first and said second variable-volume chambers, said passageway further including a primary passageway integrated into said removable passageway assembly having an entrance and exit which is unblocked for normal operating conditions and equal length L and diameter D transition zones adjacent said entrance and exit resulting in equal losses in each direction, an auxiliary flow path integrated into said removable passageway assembly such that flow through said auxiliary path is allowed in one direction from one of said first and said second variable-volume chambers to the other of said first and second variable-volume chambers when the pressure differential is above a threshold pressure occurring between said first and said second variable-volume chambers, said primary and said auxiliary flow paths utilizing a common entrance.

2. A fluid-and-elastomer device in accordance with claim 1 wherein said fluid has a kinematic viscosity $\mu$ and said diameter D, length L and kinematic viscosity $\mu$ are chosen to give stiffness K*, K', and K" which is linear as a function as amplitude.

3. A fluid-and-elastomer device in accordance with claim 1 wherein a floating member within said passageway assembly is spring loaded by a coil spring having a stiffness of 75 lb/in.

4. A fluid-and-elastomer device in accordance with claim 1 wherein said auxiliary passageway includes a plurality of channels.

5. fluid-and-elastomer device in accordance with claim 1 wherein said fluid-and-elastomer device includes two passageway assemblies formed within, each of which acts in a different direction such that one limits the pressure differential between said first and said second variable-volume chambers in one direction and the other limits the pressure differential between said first and said second variable-volume chambers in the other direction.

6. A fluid-and-elastomer device in accordance with claim 1 wherein said passageway assembly includes a floating member having a seat for sealing said fluid from flowing through said auxiliary flow path.

7. A fluid-and-elastomer device in accordance with claim 1 wherein said passageway assembly includes a floating member having a seat for sealing said fluid from flowing through said auxiliary flow path and means to adjust the amount of pressure exerted on said seat.

* * * * *